(12) United States Patent
Milius et al.

(10) Patent No.: US 7,089,324 B1
(45) Date of Patent: Aug. 8, 2006

(54) DYNAMIC INTERNET GATEWAY SERVICE

(75) Inventors: Daniel C. Milius, Huntington Beach, CA (US); Mike Giffin, Tustin, CA (US); Mark D. Goddard, Foothill Ranch, CA (US); Jeff LaSor, Foothill Ranch, CA (US); Gary E. Sullivan, Trabuco Canyon, CA (US)

(73) Assignee: Gateway Inc., Irvine, CA (US)

( * ) Notice: Subject to any disclaimer, the term of this patent is extended or adjusted under 35 U.S.C. 154(b) by 762 days.

(21) Appl. No.: 09/882,098

(22) Filed: Jun. 14, 2001

(51) Int. Cl.
*G06F 15/173* (2006.01)
*H04L 12/26* (2006.01)
*H04Q 7/24* (2006.01)

(52) U.S. Cl. ................ 709/240; 709/239; 709/223; 370/228; 370/338

(58) Field of Classification Search ............. 709/225, 709/226, 223, 239, 240; 370/238, 338
See application file for complete search history.

(56) References Cited

U.S. PATENT DOCUMENTS

| | | | |
|---|---|---|---|
| 5,159,592 A * | 10/1992 | Perkins | 370/338 |
| 5,537,412 A | 7/1996 | Shima et al. | 370/85.13 |
| 5,708,665 A | 1/1998 | Luthi et al. | 371/5.1 |
| 5,751,967 A | 5/1998 | Raab et al. | 395/200.58 |
| 5,802,300 A | 9/1998 | Tanaka et al. | 395/200.52 |
| 5,812,819 A | 9/1998 | Rodwin et al. | 395/500 |
| 5,845,079 A | 12/1998 | Wada et al. | 395/200.53 |
| 5,875,306 A * | 2/1999 | Bereiter | 709/220 |
| 5,918,016 A | 6/1999 | Brewer et al. | 395/200.5 |
| 5,922,049 A | 7/1999 | Radia et al. | 709/220 |
| 5,923,854 A | 7/1999 | Bell et al. | 395/200.73 |
| 5,974,453 A | 10/1999 | Andersen et al. | 709/220 |
| 6,012,088 A | 1/2000 | Li et al. | 709/219 |
| 6,021,429 A | 2/2000 | Danknick | 709/208 |
| 6,044,399 A | 3/2000 | Elledge | 709/220 |
| 6,070,187 A | 5/2000 | Subramaniam et al. | 709/220 |
| 6,088,725 A | 7/2000 | Kondo et al. | 709/220 |
| 6,098,116 A | 8/2000 | Nixon et al. | 710/8 |
| 6,411,806 B1 * | 6/2002 | Garner et al. | 455/428 |
| 6,457,059 B1 * | 9/2002 | Kobayashi | 709/242 |
| 6,480,480 B1 * | 11/2002 | Du | 370/338 |

(Continued)

*Primary Examiner*—Ario Etienne
*Assistant Examiner*—El Hadji M Sall
(74) *Attorney, Agent, or Firm*—Jeffrey A. Proehl; Woods Fuller Shultz & Smith

(57) ABSTRACT

The present invention provides for a local network comprising a plurality of interconnected computing devices that dynamically assigns a new Internet gateway server for the local network when the currently assigned Internet gateway is not connected to the local network and the Internet. Each one of the computing devices capable of connecting to the Internet is given a different connection priority, which indicates the desirability of assigning the respective computing device as the Internet gateway server. When a computing device in the local network is unable to access the Internet through the currently assigned Internet gateway server, the computing device broadcasts a message to the entire local network requesting to become the new Internet gateway server. The request to become the gateway includes the connection priority of the computing device. Each computing device on the local network capable of connecting to the ISP responds to each request to become the gateway having a lower connection priority by broadcasting its own request to become the gateway. The computing device having the highest connection priority in the local network receives no response from the other computing devices to its requests to become the gateway. When this occurs, the computing device having the highest connection priority assigns itself as the new Internet gateway for the local network.

24 Claims, 5 Drawing Sheets

U.S. PATENT DOCUMENTS 6,496,858 B1 * 12/2002 Frailong et al. ............ 709/221
6,571,270 B1 *  5/2003 Lai et al. .................... 718/101
6,665,705 B1 * 12/2003 Daniels-Barnes et al. ... 709/203
6,745,038 B1 *  6/2004 Callaway et al. ........ 455/456.1

* cited by examiner

DYNAMIC INTERNET GATEWAY SERVICE

FIELD OF THE INVENTION

The present invention relates to local area networks (LANs), and more particularly, to an Internet gateway server on the LAN for providing shared Internet access to computing devices on the LAN.

BACKGROUND OF THE INVENTION

A local area network (LAN) typically comprises a plurality of interconnected computing devices. Each computing device is statically or dynamically assigned an Internet Protocol (IP) address that is unique to the LAN. This allows each computing device to send a message to any other computing device on the LAN by addressing the message to the IP address of the other computing device. In addition, each computing device can broadcast a message to the entire LAN.

The LAN is typically connected to the Internet by assigning, i.e. designating, one of the computing devices on the LAN as an Internet gateway server for the LAN. The Internet gateway server establishes a connection to an Internet Service Provider (ISP) outside of the LAN. The other computing devices access the Internet by directing Internet messages, such as requests for a domain name or an external IP address, to the IP address of the Internet gateway server. The Internet gateway server then routes the Internet messages to the ISP.

The Internet gateway server for the LAN is typically assigned manually by a user or administrator of the LAN. The Internet gateway server is usually used as the primary and only computing device for connecting the LAN to the Internet.

A drawback of this arrangement is that the Internet gateway server may not be connected to the LAN, or may be connected to the LAN but not to the Internet (e.g., physically disconnected from or lost connection to the LAN or the Internet, shut down, reconfigured, or the like). When the Internet gateway server is not connected to the LAN and the Internet, the other computing devices lose access to the Internet unless a new computing device is assigned as the Internet gateway server. This requires that the user or administrator assign a new computing device as the Internet gateway server and change network settings so that the other computing devices direct Internet messages to the IP address of the newly assigned Internet gateway server.

Therefore, there is a need for a LAN that dynamically assigns a new Internet gateway server when the currently assigned Internet gateway server is not connected to the LAN and the Internet. There is also a need for a LAN that dynamically changes network settings so that the computing devices in the LAN direct Internet messages to the IP address of the newly assigned Internet gateway server.

SUMMARY OF THE INVENTION

The present invention provides for a local network comprising a plurality of interconnected computing devices that dynamically assigns a new Internet gateway server for the local network when the currently assigned Internet gateway is not connected to the local network and the Internet.

In one embodiment of the invention, each computing device in the local network is assigned a unique Internet Protocol (IP) address. One of the computing devices on the local network capable of establishing a connection to an Internet Service Provider (ISP) is assigned as the Internet gateway server for the local network. Each computing device on the local network stores in its memory the IP address of the currently assigned Internet gateway server. In addition, each computing device capable of establishing a connection to the ISP has a different connection priority, which indicates the desirability of assigning the respective computing device as the Internet gateway server for the local network.

When a computing device is unable to access the Internet through the currently assigned Internet gateway server, the computing device broadcasts a request to become the new Internet gateway server to the entire local network. The request to become the gateway includes the connection priority of the computing device. Each computing device on the local network capable of connecting to the ISP responds to each request to become the gateway having a lower connection priority by broadcasting its own request to become the gateway. The computing device having the highest connection priority in the local network receives no response from the other computing devices to its requests to become the gateway. When this occurs, the computing device having the highest connection priority assigns itself as the Internet gateway for the local network and broadcast its IP address to the other computing devices so that they can update the IP address of the Internet gateway server in their memory.

BRIEF DESCRIPTION OF THE DRAWINGS

Other aspects and advantages of the invention will become apparent upon reading the following detailed description of the preferred embodiments and upon reference to the drawings in which.

DETAILED DESCRIPTION OF THE PREFERRED EMBODIMENTS

Figure 1:
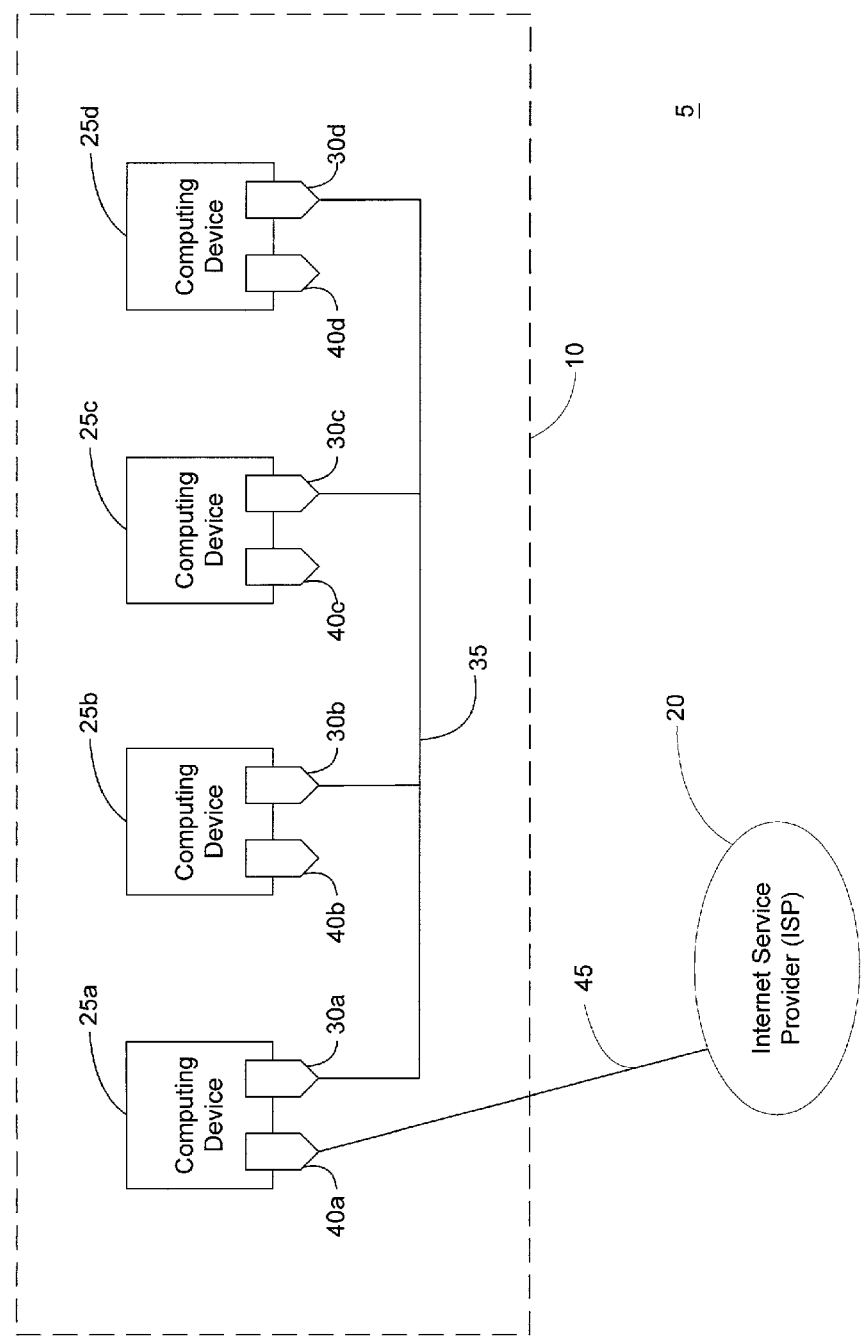
FIG. 1 is a block diagram of a computer network according to a preferred embodiment of the present invention.

FIG. 1 shows an exemplary computer network 5 according to a preferred embodiment of the present invention. The computer network 5 includes a local network 10 and an Internet Service Provider (ISP) 20. The local network 10 further comprises a plurality of computing devices 25a–25d, each computer device 25a–25d having a memory (not shown). Examples of the computing devices 25a–25d include, but are not limited to, personal computers (PCs) and Internet appliances (such as WebTV™ boxes, modem equipped cable boxes, video game consoles, and the like). Although four computing devices 25a–25d are shown in FIG. 1, those skilled in the art will appreciate that any number of computing devices may be included in the local network 10.

Each computing device 25a–25d includes a first adapter 30a–30d coupled to an interconnection 35 among the computing devices 25a–25d in the local network 10. Examples of the first adapter 30a–30d include, but are not limited to, an Ethernet adapter or a Home Phone Network Adapter (HPNA). Each computing device 25a–25d is assigned an Internet Protocol (IP) address that is unique to the local network 10. Each computing device 25a–25d may send a message to any other computing device 25a–25d in the local network 10 by addressing the message to the IP address of the other computing device 25a–25d. In addition, each computing device 25a–25d may broadcast a message to the entire local network 10, i.e. every computing device 25a–25d in the local network 10.

Each computing device 25a–25d further includes a second adapter 40a–40d capable of establishing a connection 45 to an ISP 20 outside of the local network 10. Examples of the second adapter 40a–40d include, but are not limited to, a dialup adapter and an Ethernet adapter. Furthermore, each computing device 25a–25d includes software and login information stored in its memory for establishing a connection 45 with the ISP 20. The login information may include, for example, a username, a password, and a dial-in number and/or external IP address of the ISP 20.

The local network 10 is configured such that one of the computing devices 25a–25d is connected to the ISP 20 at a time as shown in FIG. 1. The computing device 25a–25d currently connected to the ISP terminal 20 serves as an Internet gateway server for the local network 10. The other computing devices 25a–25d in the local network 10 access the Internet by directing Internet messages, such as requests for a domain name or external IP address, to the IP address of the computing device 25a–25d currently serving as the Internet gateway server for the local network 10. The computing device 25a–25d serving as the Internet gateway server routes the Internet message to the ISP 20. The computing devices 25a–25d that access the Internet through the Internet gateway server are commonly referred to as "clients" of the Internet gateway server.

In FIG. 1, computing device 25a is connected to the ISP 20 and serves as the Internet gateway server for the local network 10. The other computing devices 25b–25d on the local network 10 access the Internet by directing Internet messages to the IP address of computing device 25a.

Figure 2:
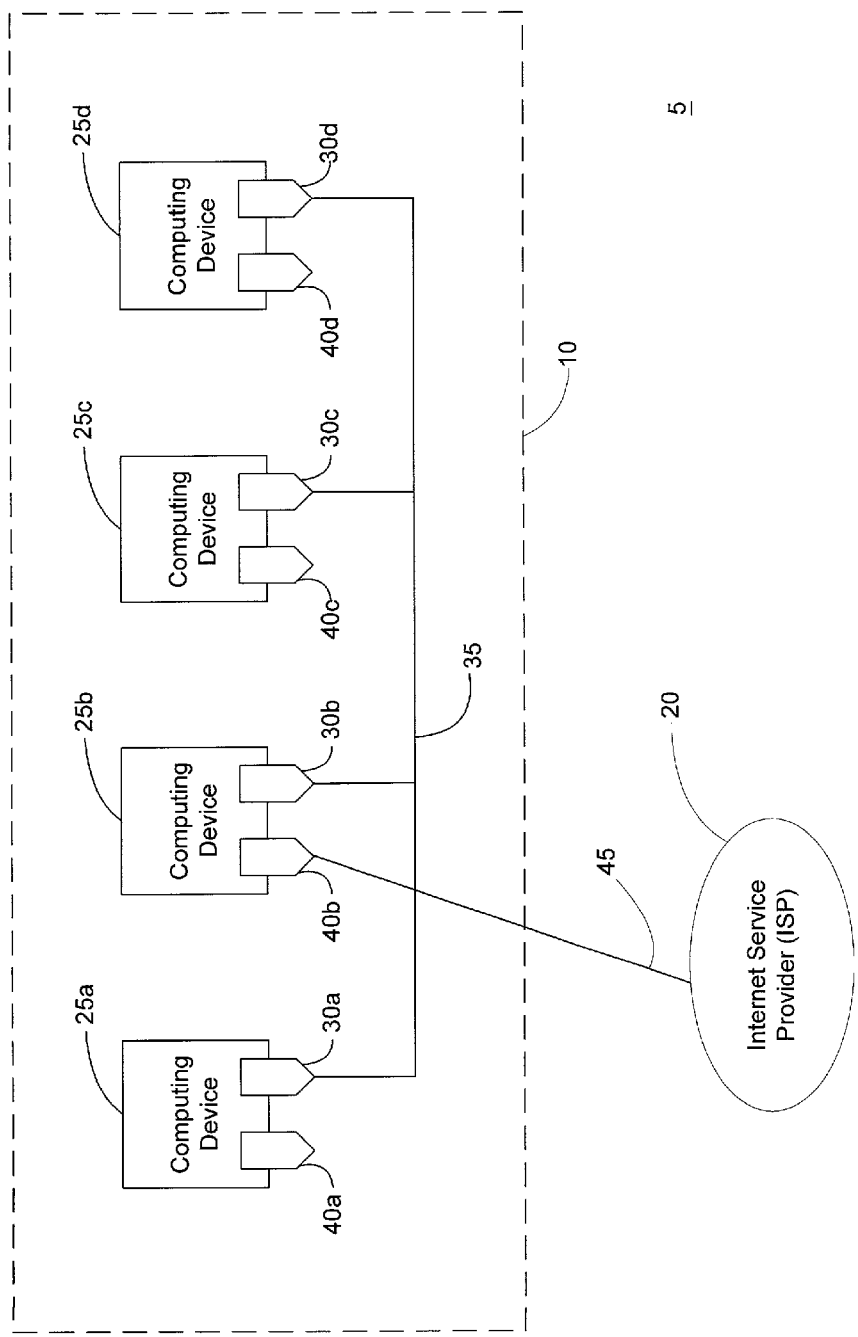
FIG. 2 is a block diagram of the computer network shown in FIG. 1 in which another computer device is connected to the Internet Service Provider (ISP).

The local network 10 may be reconfigured so that any other computing device 25a–25d in the local network 10 equipped with a second adapter 40a–40d is capable of serving as the Internet gateway server for the local network 10. In FIG. 2, for example, the local network 10 of FIG. 1 is reconfigured so that computing device 25b is connected to the ISP 20 and serves as the Internet gateway server for the local network 10. This reconfiguration requires changing the IP address used by the computing devices 25a–25d for directing Internet messages to the Internet gateway server from the IP address of computing device 25a to the IP address of computing device 25b. The computing devices 25a and 25b serving as the Internet gateway server in FIGS. 1 and 2, respectively, do not have to connect to the same ISP 20. These two computing devices 25a and 25b may, for example, subscribe to different Internet providers with different ISPs.

Figure 3:
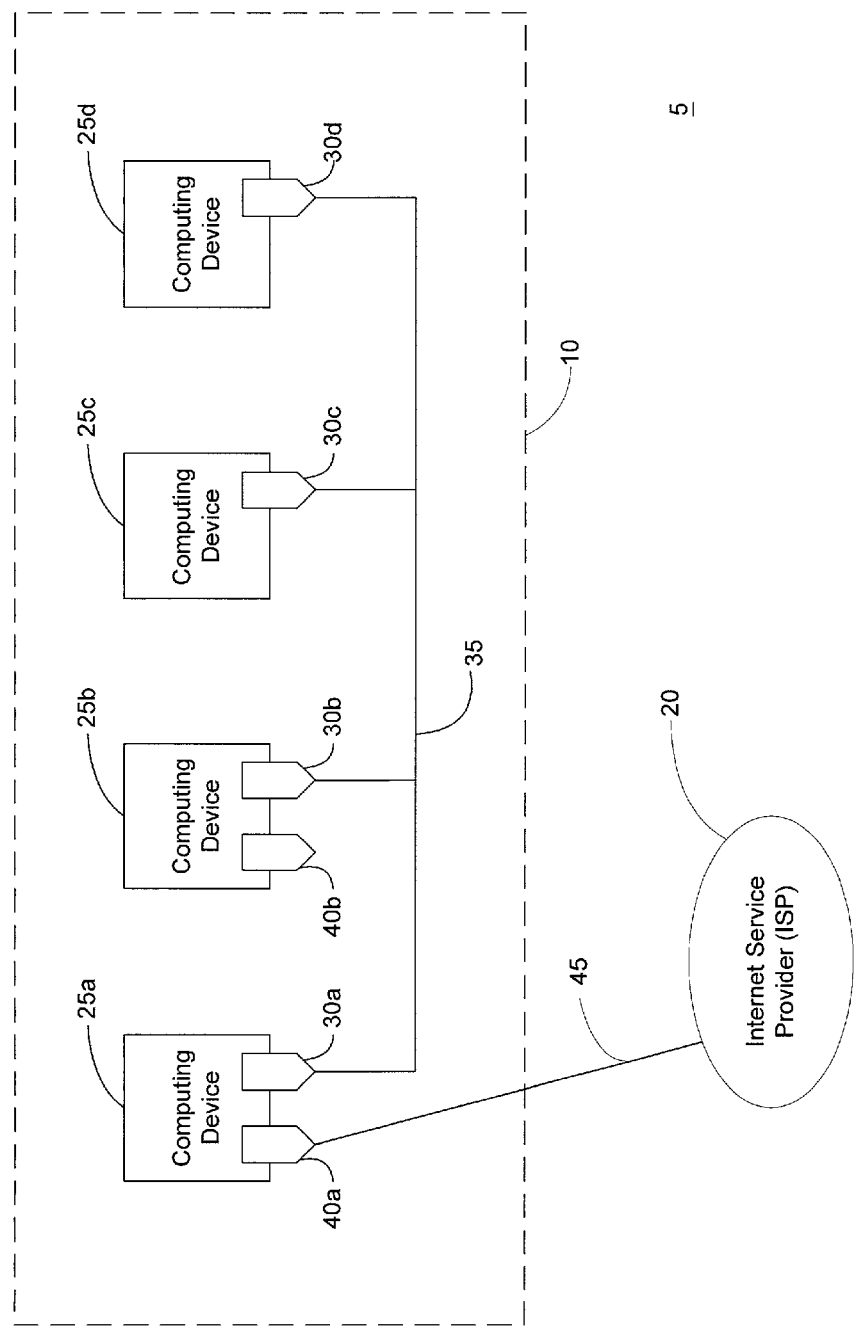
FIG. 3 is a block diagram of the computer network shown in FIG. 1 in which two of the computing devices do not have a second adapter.

Although each computing device 25a–25d is shown having the second adapter 40a–40d, not every computing device 25a–25d in the local network 10 is required to have the second adapter 40a–40d. For example, computing devices 25c and 25d may only have the first adapter 30c and 30d connecting them to the local network 10 as shown in FIG. 3. In this example, computing device 25c and 25d are not capable of connecting to an ISP 20, and therefore, may not serve as the Internet gateway server for the local network 10. Computing devices 25c and 25d use one of the other computing devices 25a and 25b currently assigned as the Internet gateway server to access the Internet.

The IP addresses of the computing devices 25a–25d in the local network 10 may be statically assigned, i.e. pre-assigned, especially for small local networks in which the IP addresses of the computing devices 25a–25d change infrequently. The IP addresses of the computing devices 25a–25d may also be dynamically assigned. This may be done by having one of the computing devices 25a–25d serve as a Dynamic Host Configuration Protocol (DHCP) server for the local network 10. The DHCP server allocates and assigns the IP addresses to the computing devices 25a–25d in the local network 10. The DHCP server also maintains a table or database including the IP addresses of the computing devices 25a–25d in the local network 10 and the IP address of the computing device 25a–25d currently serving as the Internet gateway server. When a computing device 25a–25d is connected to the local network 10, the computing device 25a–25d requests an IP address from the DHCP server. In response, the DHCP server assigns an IP address to the computing device 25a–25d that is unique to the local network 10.

The DHCP server leases an IP address to each computing device 25a–25d on the local network 10 for a period of time. At the end of this period, each computing device 25a–25d has to contact the DHCP server to renew its IP address.

Each computing device 25a–25d includes the IP address of the computing device 25a–25d serving as the Internet gateway server stored in its memory. Each computing device 25a–25d on the local network 10 also includes Dynamic Internet Gateway Service (DIGS) software loaded into its memory. The DIGS software enables the computing devices 25a–25d to negotiate with each other to dynamically select and assign one of the computing devices 25a–25d as the Internet gateway server for the local network 10.

The DIGS software on each computing device 25a–25d stores a connection priority for the respective computing device 25a–25d locally in memory. The connection priority, which is preferably an integer number in the range of 1 to 100, indicates the desirability of assigning the respective computing device as the Internet gateway server. If the computing device 25a–25d is not equipped with the second adapter 40a–40d and thus unable to connect to the ISP 20 and function as the Internet gateway server, the connection priority of the computing device 25a–25d may be zero or null, a negative value, or the like. The connection priority may also utilize other values for indicating priorities, such as alphabetic characters (i.e., A–Z), colors (e.g., red is high priority, white is low priority, and the like), or the like. The connection priority of a computing device 25a–25d may be based on several factors, such as the presence or absence of the second adapter 40a–40d and thus the ability of the computing device 25a–25d to connect to the ISP 20, the connection speed of the second adapter 40a–40d to the ISP 20, the Internet access fee charged by the ISP 20 used by the computing device 25a–25d, the reliability of the Internet access provided by the ISP 20, and the like. For example, an Ethernet connection may be more desirable than a dialup connection, an ISP 20 that charges a flat fee for unlimited Internet access may be more desirable than an ISP 20 that charges by the time spent accessing the Internet, and a more reliable ISP 20 may obviously be more desirable than a less reliable ISP 20. The connection priority of a computing device 25a–25d may be set by a user and/or by the DIGS software on the computing device 25a–25d. For example, the DIGS software may identify the type of second adapter 40a–40d used by the respective computing device 25a–25d for connecting to the ISP 20 to determine the connection priority of the computing device 25a–25d based on the connection speed of the second adapter 40a–40d. Preferably, no two computing devices 25a–25d in the local network 10 are given the same connection priority, although it is possible to assign the same connection priority to different computing devices 25a–25d.

The DIGS software of the computing devices 25a–25d is capable of dynamically selecting and assigning the Internet gateway server for the local network 10 when one of the computing devices 25a–25d is unable to access the Internet through the currently assigned Internet gateway server. This may occur, for example, when the computing device 25a–25d currently assigned as the Internet gateway server is not connected to the ISP 20 or the local network 10 (e.g., physically disconnected from or lost connection to the ISP 20 or the local network 10, shut down, reconfigured, or the like). In this case, a computing device 25a–25d attempting to access the Internet through the currently assigned Internet gateway server may receive an error message or no response. A computing device 25a–25d may also be unable to access the Internet when no computing device 25a–25d on the local network 10 has been assigned as the Internet gateway server. In this case, the computing device 25a–25d does not have stored in its memory an IP address for the Internet gateway server.

Figure 4:
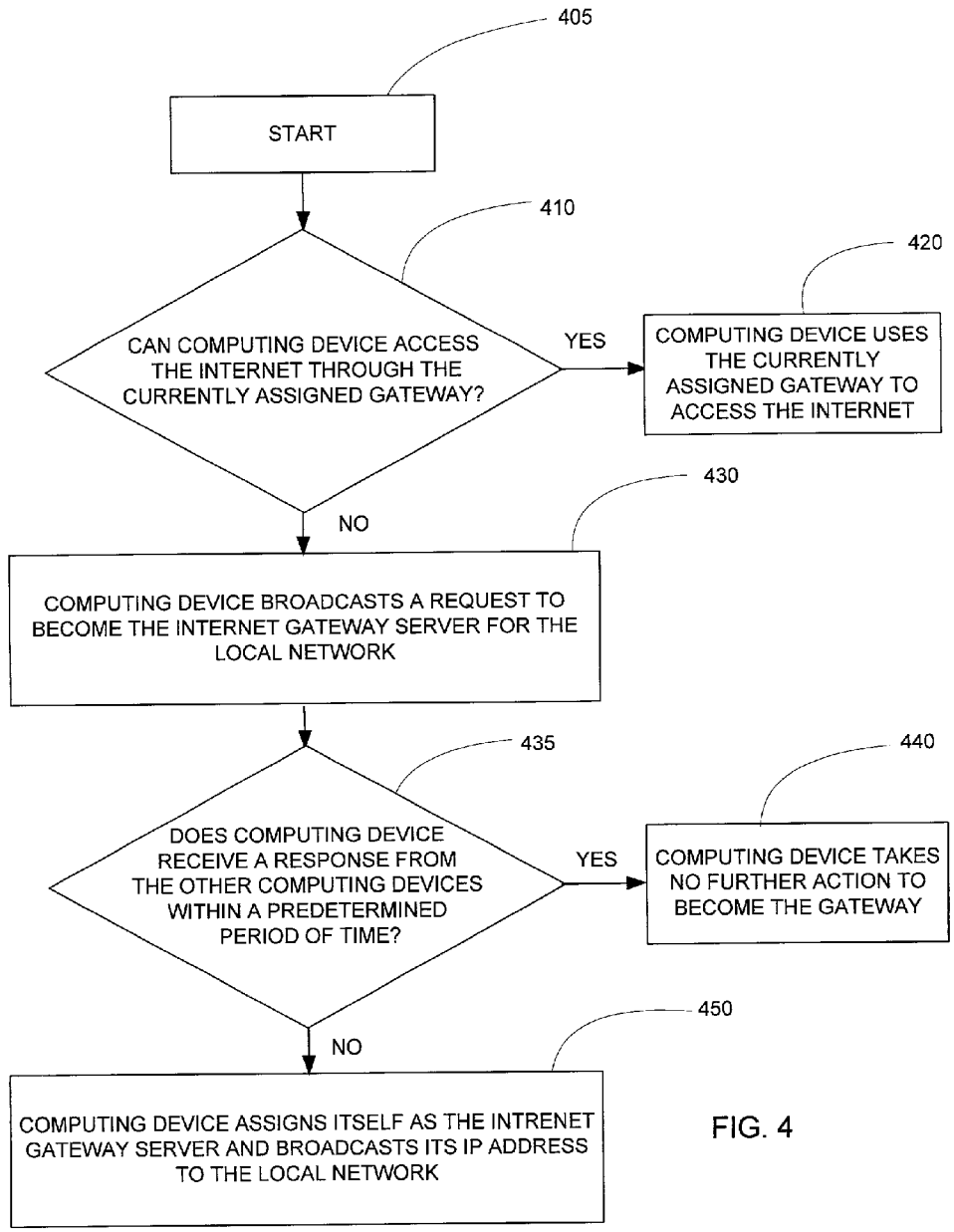
FIG. 4 is a flow chart illustrating a method for assigning a new Internet gateway when a computing device is unable to access the Internet through the currently assigned Internet gateway according to a preferred embodiment of the present invention.
Figure 5:
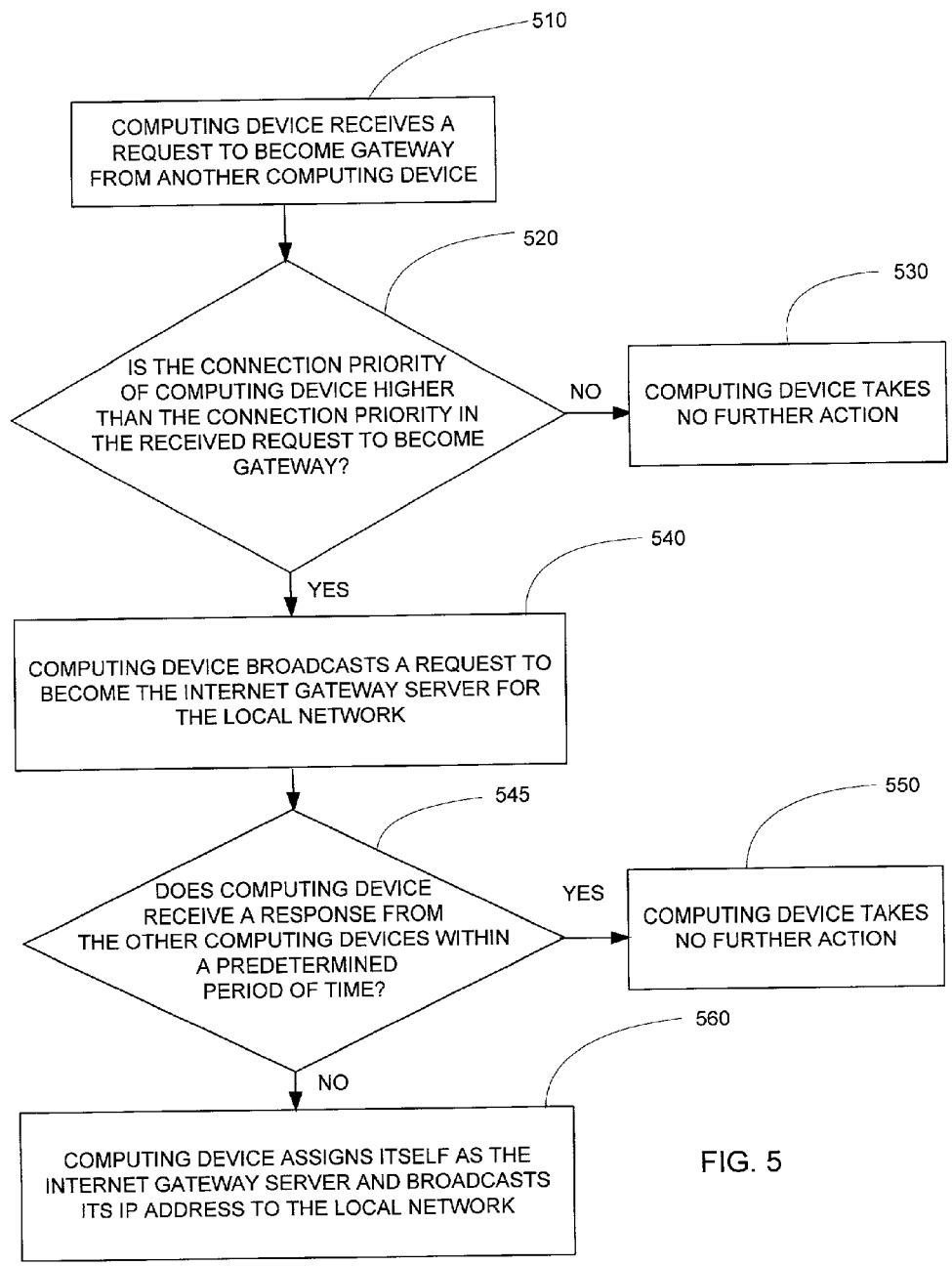
FIG. 5 is a flow chart of steps carried out by a computing device when the computing device receives a request to become the Internet gateway from another computing device.

Turning now to FIGS. 4 and 5, the steps carried out by the DIGS software on the computing devices 25a–25d for dynamically selecting and assigning the Internet gateway server will be described. The DIGS software on a computing device 25a–25d attempting to access the Internet through the currently assigned Internet gateway server follows the steps in FIG. 4, which starts at step 405. In step 410, the computing device 25a–25d attempts to access the Internet through the currently assigned Internet gateway server. If the computing device 25a–25d is successful, then the computing device 25a–25d advances to step 420 and uses the currently assigned Internet gateway server to access the Internet. If, however, the computing device 25a–25d is unsuccessful, then the computing device 25a–25d advances to step 430 and broadcasts a message to the entire local network 10, requesting to become the Internet gateway server. The request to become the gateway includes the connection priority of the computing device 25a–25d. The computing device 25a–25d then waits for a response from the other computing devices 25a–25d for a predetermined period of time in step 435. The predetermined time period preferably may range from 1 to 5 seconds, although other time periods may be utilized. If the computing device 25a–25d receives a response from at least one of the other computing devices 25a–25d within the predetermined time period, then the computing device 25a–25d advances to step 440 and takes no further action to become the Internet gateway server. As will be explained shortly, this occurs when at least one of the other computing devices 25a–25d has a higher connection priority. If, however, the computing device 25a–25d receives no response from the other computing devices 25a–25d within the predetermined time period, then the computing device 25a–25d advances to step 450 and assigns itself as the Internet gateway server for the local network 10. The computing device 25a–25d assigned as the Internet gateway server then broadcasts its IP address to the other computer devices 25a–25d so that they can update the IP address of the Internet gateway server stored in their memory.

The DIGS software on each computing device 25a–25d capable of becoming the Internet gateway server responds to a request to become the gateway broadcast from any one of the other computing devices 25a–25d by following the steps in FIG. 5. In step 510, a computing device 25a–25d capable of becoming the Internet gateway server receives a request to become the gateway from another computing device 25a–25d. In step 520, the computing device 25a–25d determines whether or not its connection priority is higher than the connection priority included in the received request to become the gateway. If the connection priority of the computing device 25a–25d is less than the connection priority included in the received request to become the gateway, then the computing device 25a–25d advances to step 530 and takes no further action (i.e., sends no response to the request). If, however, the connection priority of the computing device 25a–25d is higher than the connection priority included in the received request to become the gateway, then the computing device 25a–25d advances to step 540 and broadcasts its own request to become the Internet gateway server to the entire local network 10 within the predetermined time period. The request to become the gateway includes the connection priority of the computing device 25a–25d. The computing device 25a–25d then waits for a response from the other computing devices 25a–25d for the predetermined period of time in step 545. If the computing device 25a–25d receives a response (e.g. request to become the gateway) from at least one of the other computing devices 25a–25d within the predetermined time period, then the computing device 25a–25d advances to step 550 and takes no further action. If, however, the computer device 25a–25d receives no response (e.g. request to become the gateway) from the other computing devices 25a–25d within the predetermined time period, then the computing device 25a–25d advances to step 560 and assigns itself as the Internet gateway server. The computing device 25a–25d then broadcasts its IP address to the local network 10 so that the other computing devices 25a–25d can update the IP address of the Internet gateway server stored in their memory.

The steps outlined in FIG. 5 provide a mechanism by which the computing devices 25a–25d on the local network 10 negotiate with each other in selecting and assigning the Internet gateway server. Each time one of the computing devices 25a–25d broadcasts a request to become the gateway, the other computing devices 25a–25d having a higher connection priority respond with their own request to become the gateway. This allows computing devices 25a–25d to take priority over a request to become the gateway from a computing device 25a–25d having a lower priority by responding with their own request to become the gateway. Eventually, the computing device 25a–25d having the highest connection priority on the local network 10 broadcasts a request to become the gateway and receives no response from the other computing devices 25a–25d within the predetermined time period. This is because all the other computer devices 25a–25d on the local network 10 have a lower connection priority, and therefore, do not respond to the request to become the gateway broadcast from the computing device 25a–25d having the highest priority. At this point, the computing device 25a–25d having the highest connection priority assigns itself as the Internet gateway server and broadcasts its IP address to the other computing devices 25a–25d so they can update their memory accordingly.

In another embodiment of the present invention, the computing device 25c–25d initially attempting to access the Internet through the Internet gateway does not have a second adapter for connecting to an ISP 20, as illustrated in FIG. 3. In this embodiment, the computing device 25c–25d does not broadcast a request to become the gateway when it is unable to access the Internet through the currently assigned Internet gateway server. Instead, the computing device 25c–25d broadcasts a request for a new Internet gateway to the entire local network 10, upon which each computing device 25a–25b capable of becoming the gateway server responds with a request to become the gateway server. Each computing device 25a–25d then responds to each request to become the gateway server from the other computing devices 25a–25d by following the steps in FIG. 5. This continues until the computing device 25a–25d having the highest priority number receives no request from the other computing devices 25a–25d to become the gateway within the predetermined time period. At this point, the computing device 25a–25d having the highest connection priority assigns itself as the Internet server and broadcasts its IP address to the other computing devices 25a–25d so they can update their memory accordingly.

In still another embodiment, the DIGS software on each computing device 25a–25d provides a random number for the respective computing device 25a–25d. The DIGS software may include a random number generator for generating the random number for the respective computing device 25a–25d. The random number may be 32-bits in length so that the probability of the DIGS software on two computing devices 25a–25d independently generating the same random number is very remote. Alternatively, a different random number may be pre-assigned to each copy of the DIGS software on the computing devices 25a–25d. The DIGS software on each computing device 25a–25d stores the random number for the computing device 25a–25d locally in memory.

The random numbers allow more than one computing device 25a–25d on the local network 10 to have the same connection priority by functioning as a tie breaker between two computing devices 25a–25d having the same connection priority. In this embodiment, the computing devices 25a–25d include their random numbers in a request to become the gateway. When a computing device 25a–25d receives a request to become the gateway from another computing device 25a–25d having the same connection priority in step 520, then the computing device 25a–25d compares its random number to the random number included in the received request to become the gateway. If the computing device 25a–25d has a random number lower than the random number included in the received request to become the gateway, then the computing device 25a–25d advances to step 530 and takes no further action. If, however, the computing device 25a–25d has a random number higher than the random number included in the received request to become the gateway, then the computing device 25a–25d advances to step 540 and responds with its own request to become the gateway. If two computing devices 25a–25d on the local network 10 both have the highest connection priority, then the computing device 25a–25d having the highest random number becomes the Internet gateway server.

In yet another embodiment, the Internet gateway server is identified in the memory of each computing device 25a–25d by a predetermined gateway IP address. Each time a computing device 25a–25d becomes the Internet gateway server for the local network 10, the computing device 25a–25d assumes the predetermined gateway IP address. That way, the computing device 25a–25d does not need to broadcast its IP address to the local network 10 when it becomes the Internet gateway server. This is because the other computing devices 25a–25d already use the predetermined gateway IP address to direct Internet messages to the Internet gateway server. As a result, the computing devices 25a–25d do not have to update their memory each time a computing device 25a–25d becomes the Internet gateway server. In this embodiment, the Internet gateway server is in effect an additional "virtual" machine on the local network 10 that is addressed using the predetermined gateway IP address. The predetermined gateway IP address may be included in the DIGS software on each computing device 25a–25d.

Each computing device 25a–25d in this embodiment may preferably be assigned at least two IP addresses. One IP address is used for addressing the respective computing device 25a–25d as a "client" on the local network 10, and the other IP address is used for dynamically assuming the predetermined gateway IP address when the respective computing device 25a–25d becomes the Internet gateway server. Several commercially operating systems easily allow a computing device to be assigned multiple IP addresses, including Linux, Windows NT and Windows 2000.

While assigning multiple IP addresses to a computing device 25a–25d is easy using Linux, Windows NT and Windows 2000, assigning multiple IP addresses to a computing device 25a–25d using other operating systems, such as Windows 98, may be very difficult. One way to address this problem is to have one of the computing devices 25a–25d on the local network 10, which is capable of being assigned two IP addresses, function as a proxy for the other computing devices 25a–25d. One IP address is used for addressing the respective computing device 25a–25d as a "client" on the local network 10, and the other IP address is used for addressing the respective computing device 25a–25d as the proxy for the local network 10. In this embodiment, the other computing devices 25a–25d access the Internet by directing Internet messages to the IP address of the proxy, and the proxy then routes the Internet messages to the currently assigned Internet gateway. This requires that the proxy keep track of the IP address of the computing device 25a–25d currently assigned as the Internet gateway server.

An advantage of this embodiment is that only the proxy needs to support two IP addresses. In addition, only the computing device 25a–25d functioning as the proxy for the local network 10 needs to keep track of the IP address of the currently assigned Internet gateway server. This is because the other computing devices 25a–25d direct Internet messages to the IP address of the proxy, which may be fixed. The proxy then routes the Internet messages to the currently assigned Internet gateway. In this embodiment, when a computing device 25a–25d becomes the Internet gateway server, the computing device 25a–25d may send its IP address to the proxy so the proxy can update the IP address of the currently assigned Internet gateway stored in its memory.

Those skilled in the art will appreciate that various modification may be made to the preferred embodiments described above without departing from the spirit and scope of the invention. Therefore, the invention is not to be restricted or limited except in accordance with the following claims and their legal equivalents.

The invention claimed is:

1. In a network comprising a plurality of computing devices, each computing device having a memory and being capable of accessing the Internet, and at least one of the computing devices being capable of connecting to the Internet, each computing device capable of connecting to the Internet having a connection priority, a method for assigning an Internet gateway for the network, comprising the steps of:

broadcasting to the network a request to become the gateway from one of the computing devices capable of connecting to the Internet, wherein the request to become the gateway includes the connection priority of the computing device broadcasting the request; and assigning the computing device broadcasting the request as the gateway for the network if the computing device broadcasting the request does not receive a response from the other computing devices within a predetermined time period.

2. The method of claim 1, wherein the predetermined time period is approximately 1 to 5 seconds.

3. The method of claim 1, wherein each computing device is assigned a unique Internet protocol (IP) address, further comprising the steps of:

broadcasting to the network the IP address of the computing device assigned as the gateway for the network; and storing in the memory of each computing device the IP address broadcasted to the network as the IP address of the gateway for the network.

4. The method of claim 1, wherein the computing device assigned as the gateway for the network is assigned a unique client IP address and assumes a predetermined gateway IP address.

5. The method of claim 1, wherein one of the computing devices is capable of operating as a proxy for the Internet gateway and is capable of being assigned a unique client IP address and a proxy IP address, and further wherein at least one of the other computing devices is capable of accessing the Internet by performing the steps of:

transmitting from the respective computing device to the proxy IP address of the proxy a message to be sent to the Internet; and transmitting from the proxy IP address of the proxy to the computing device assigned as the gateway for the network the message to be sent to the Internet.

6. The method of claim 1, wherein at least one of the other computing devices capable of connecting to the Internet responds to the broadcasted request to become the gateway by performing the step of:

determining whether the connection priority of the respective computing device is higher than the connection priority included in the broadcasted request to become the gateway;

if the connection priority of the respective computing device is not higher than the connection priority included in the broadcasted request, sending no response to the broadcasted request; and if the connection priority of the respective computing device is higher than the connection priority included in the broadcast request, performing the steps of:

broadcasting to the network a request to become the gateway from the respective computing device within the predetermined time period, wherein the request to become the gateway includes the connection priority of the respective computing device; and assigning the respective computing device as the gateway for the network if the respective computing device receives no response from the other computing devices within the predetermined time period.

7. The method of claim 6, wherein the predetermined time period is approximately 1 to 5 seconds.

8. The method of claim 6, wherein each computing device is assigned a unique Internet protocol (IP) address, further comprising the step of:

broadcasting to the network the IP address of the computing device assigned as the gateway for the network; and storing in the memory of each computing device the IP address broadcasted to the network as the IP address of the gateway for the network.

9. The method of claim 6, wherein the computing device assigned as the gateway for the network is assigned a unique client IP address and assumes a predetermined gateway IP address.

10. The method of claim 6, wherein one of the computing devices is capable of operating as a proxy for the Internet gateway and is capable of being assigned a unique client IP address and a proxy IP address, further wherein at least one of the other computing devices is capable of accessing the Internet by performing the steps of:

transmitting from the respective computing device to the proxy a IP address of the proxy a message to be sent to the Internet; and transmitting from the proxy IP address of the proxy to the computing device assigned as the gateway for the network the message to be sent to the Internet.

11. A storage medium readable by a computing device and having instructions encoded thereon for causing the computing device to perform, in a network comprising a plurality of computing devices, each computing device having a memory and being capable of accessing the Internet, and at least one of the computing devices being capable of connecting to the Internet, each computing device capable of connecting to the Internet having a connection priority, a method for assigning an Internet gateway for the network, the method comprising the steps of:

broadcasting to the network a request to become the gateway from one of the computing devices capable of connecting to the Internet, wherein the request to become the gateway includes the connection priority of the computing device broadcasting the request; and assigning the computing device broadcasting the request as the gateway for the network if the computing device broadcasting the request does not receive a response from the other computing devices within a predetermined time period.

12. The storage medium of claim 11, wherein each computing device is assigned a unique Internet protocol (IP) address, and further wherein the method further comprises the steps of:

broadcasting to the network the IP address of the computing device assigned as the gateway for the network; and storing in the memory of each computing device the IP address broadcasted to the network as the IP address of the gateway for the network.

13. The storage medium of claim 11, wherein the computing device assigned as the gateway for the network is assigned a unique client IP address and assumes a predetermined gateway IP address.

14. The storage medium of claim 11, wherein one of the computing devices is capable of operating as a proxy for the Internet gateway and is capable of being assigned a unique client IP address and a proxy IP address, and further wherein at least one of the other computing devices is capable of accessing the Internet by performing the steps of:

transmitting from the respective computing device to the proxy IP address of the proxy a message to be sent to the Internet; and transmitting from the proxy IP address of the computing device assigned as the gateway for the network the message to be sent to the Internet.

15. The storage medium of claim 11, wherein at least one of the other computing devices capable of connecting to the Internet responds to the broadcasted request to become the gateway for the network by performing the steps of:

determining whether the Connection priority of the respective computing device is higher than the connection priority included in the broadcasted request to become the gateway;

if the connection priority of the respective computing device is not higher than the connection priority included in the broadcasted request, sending no response to the broadcasted request; and if the connection priority of the respective computing device is higher than the connection priority included in the broadcasted request, performing the steps of:

broadcasting to the network a request to become the gateway from the respective computing device within the predetermined time period, wherein the request to become the gateway includes the connection priority of the respective computing device; and assigning the respective computing device as the gateway for the network if the respective computing device receives no response from the other computing devices within the predetermined time period.

16. In a network comprising a plurality of computing devices, each computing device having a memory and being capable of accessing the Internet, and at least on of the computing devices being capable of connecting to the Internet, each computing device capable of connecting to the Internet having a connection priority, a method for assigning an Internet gateway for the network, comprising the steps of:

broadcasting to the network a request for a new gateway from one of the computing devices;

in response to the request for new gateway, broadcasting to the network a request to become the gateway from each computing device capable of connecting to the Internet, wherein each request to become the gateway includes the connection priority of the respective computing device broadcasting the request to become the gateway; and in response to the request to become the gateway, performing by each computing device capable of connecting to the Internet steps of:

determining whether the connection priority of the respective computing device is higher than the connection priority included in the broadcasted request to become the gateway; if the connection priority of the respective computing device is not higher than the connection priority included in the broadcasted request to become the gateway, sending no response to the broadcasted request to become the gateway; and if the connection priority of the respective computing device is higher than the connection priority included in the broadcasted request to become the gateway, performing the steps of:

broadcasting to the network a request to become the gateway from the respective computing device within the predetermined time period, wherein the request to become the gateway includes the connection priority of the respective computing device; and assigning the respective computing device as the new gateway for the network if the respective computing device receives no response from the other computing devices within the predetermined time period.

17. The method of claim 16, wherein the predetermined time period is approximately 1 to 5 seconds.

18. The method of claim 16, wherein each computing device is assigned a unique Internet protocol (IP) address, further comprising the steps of:

broadcasting to the network the IP address of the computing device assigned as the new gateway for the network; and storing in the memory of each computing device the IP address broadcasted to the network as the IP address of the gateway for the network.

19. The method of claim 16, wherein the computing device assigned as the gateway for the network is assigned a unique client IP address and assumes a predetermined gateway IP address.

20. The method of claim 16, wherein one of the computing devices is capable of operating as a proxy for the Internet gateway and is capable of being assigned a unique client IP address and a proxy IP address, and further wherein at least one of the other computing devices is capable of accessing the Internet by performing the steps of:

transmitting from the respective computing device to the proxy IP address of the proxy a message to be sent to the Internet; and transmitting from the proxy IP address of the proxy to the computing device assigned as the gateway for the network the message to be sent to the Internet.

21. A storage medium readable by a computing device and having instructions encoded thereon for causing the computing device to perform, in a network comprising a plurality of computing devices, each computing device having a memory and being capable of accessing the Internet, and at least one of the computing devices being capable of connecting to the Internet, each computing device capable of connecting to the Internet having a connection priority, a method for assigning an Internet gateway for the network, the method comprising the steps of:

broadcasting to the network a request for a new gateway from one of the computing devices;

in response to the request for the new gateway, broadcasting to the network a request to become the gateway from each computing device capable of connecting to the Internet, wherein each request to become the gateway includes the connection priority of the respective computing device broadcasting the request to become the gateway; and in response to the request to become the gateway, performing by each computing device capable of connecting to the Internet the steps of:

determining whether the connection priority of the respective computing device is higher than the connection priority included in the broadcasted request to become the gateway;

if the connection priority of the respective computing device is not higher than the connection priority included in the broadcasted request to become the gateway, sending no response to the broadcasted request to become the gateway; and if the connection priority of the respective computing device is higher than the connection priority included in the broadcasted request to become the gateway, performing the steps of:
    broadcasting to the network a request to become the gateway from the respective computing device within the predetermined time period, wherein the request to become the gateway includes the connection priority of the respective computing device; and
    assigning the respective computing device as the gateway for the network if the respective computing device receives no response from the other computing devices within the predetermined time period.

22. The storage medium of claim 21, wherein each computing device is assigned a unique Internet protocol (IP) address, and further wherein the method further comprises the steps of:
    broadcasting to the network the IP address of the computing device assigned as the new gateway for the network; and
    storing in the memory of each computing device the IP address broadcasted to the network as the IP address of the gateway for the network.

23. The storage medium of claim 21, wherein the computing device assigned as the gateway for the network is assigned a unique client IP address and assumes a predetermined gateway IP address.

24. The storage medium of claim 21, wherein one to the computing devices is capable of operating as a proxy for the Internet gateway and is capable of being assigned a unique client IP address and a proxy IP address, and further wherein at least one of the other computing devices is capable of accessing the Internet by performing the steps of:
    transmitting from the respective computing device to the proxy IP address of the proxy a message to be sent to the Internet; and
    transmitting from the proxy IP address of the proxy to the computing device assigned as the gateway for the network the message to be sent to the Internet.

* * * * *